United States Patent
Brunswig et al.

(10) Patent No.: US 7,797,370 B2
(45) Date of Patent: Sep. 14, 2010

(54) SYSTEMS AND METHODS FOR ENHANCED MESSAGE SUPPORT OF COMMON MODEL INTERFACE

(75) Inventors: Frank Brunswig, Heidelberg (DE); Markus Cherdron, Muhlhausen (DE); Reiner Hammerich, Wiesloch (DE); Frank Weigel, Saarbrucken (DE); Jorg Weller, Heidelberg (DE)

(73) Assignee: SAP AG, Walldorf (DE)

( * ) Notice: Subject to any disclaimer, the term of this patent is extended or adjusted under 35 U.S.C. 154(b) by 966 days.

(21) Appl. No.: 11/260,317

(22) Filed: Oct. 28, 2005

(65) Prior Publication Data

US 2007/0100943 A1 May 3, 2007

(51) Int. Cl.
*G06F 15/16* (2006.01)
(52) U.S. Cl. .................. 709/201; 715/200; 705/342
(58) Field of Classification Search .................. 709/203
See application file for complete search history.

(56) References Cited

U.S. PATENT DOCUMENTS 5,673,386 A * 9/1997 Batra .......................... 714/38
2002/0004381 A1 * 1/2002 Theimer ...................... 455/412
2005/0021976 A1 * 1/2005 Trossen ....................... 713/182
2005/0138128 A1 * 6/2005 Baniel et al. ................ 709/206
2006/0047704 A1 * 3/2006 Gopalakrishnan ........ 707/104.1
2006/0182255 A1 * 8/2006 Luck et al. ............. 379/220.01
2007/0036143 A1 * 2/2007 Alt et al. ..................... 370/352
2007/0081518 A1 * 4/2007 Jain et al. .................... 370/352

* cited by examiner

*Primary Examiner*—Hassan Phillips
*Assistant Examiner*—Hamza Algibhah
(74) *Attorney, Agent, or Firm*—Mintz Levin Cohn Ferris Glovsky and Popeo, P.C.

(57) ABSTRACT

Methods and systems are described for providing for messages having parameters to an interface. An exemplary method includes determining whether at least one message is related to one or more objects at a server based on a first parameter included within the message; determining a lifetime of the message based on a second parameter included within the message; determining a severity of the message based on a third parameter included within the message; and processing the message, at the user interface, based the results of the determining steps.

11 Claims, 6 Drawing Sheets

SYSTEMS AND METHODS FOR ENHANCED MESSAGE SUPPORT OF COMMON MODEL INTERFACE

BACKGROUND

I. Field of the Invention

The present invention generally relates to messages, and, more particularly, to methods and systems for providing messages between computers.

II. Background of the Invention

For organizations to enable business agility, they must ensure that applications available to the enterprise are not only high-performance business applications driving efficiencies, but also that they become flexible building blocks of future business systems. One way of providing building blocks is through the use of services. A service, such as an application or web service, is a program that makes itself available to users over the Internet. Services typically implement standardized protocols, such as XML (Extensible Markup Language) and Simple Object Access Protocol (SOAP), although other protocols can be used. Moreover, there is usually some type of web mechanism, such as Universal Description, Discovery, and Integration (UDDI) that enables a client computer to readily locate the service and its public Application Program Interface (API). Although a service is usually provided over an Internet, the service may be accessed over an intranet.

Although services are often designed to expose functionality of individual applications, sometimes the functionality is too limited to be an efficient building block for enterprise-wide business processes. A solution to this limitation has been the use of a Service Oriented Architecture (SOA). The SOA is a middleware, which builds on the benefits of services. A SOA allows abstraction of objects and Business Objects (BO), instantiated as services. The abstraction is a result of aggregating services into business-level enterprise services to provide more meaningful building blocks for the task of automating enterprise-scale business processes or scenarios. Enterprise services allow organizations to efficiently develop composite applications, such as applications that compose functionality and information from existing systems and services to support new business processes or scenarios. An example of a SOA is the Enterprise Service Framework (ESF) commercially available from SAP AG, Walldorf, Germany. The term "SOA" may also be used to refer to a "distributed objects" architecture, such as CORBA (Common Object Request Broker Architecture) and DCOM (Distributed Component Object Model).

A common model interface (CMI) may serve as a general interface for software layers used in applications, such as services. The software layers may include applications and databases from a variety of vendors. For example, a CMI may provide an interface between a user interface, such as Web Dynpro (commercially available from SAP AG), and a services infrastructure, such as the ESF. The CMI may allow various applications to work together, independent of the platform on which the applications are built.

SUMMARY

The present invention provides methods and apparatus, including computer program products, for providing an interface for messages having parameters.

In one exemplary embodiment, there is provided a method for providing message to an interface. The method includes determining whether at least one message is related to one or more objects at a server based on a first parameter included within the message; determining a lifetime of the message based on a second parameter included within the message; determining the severity of the message based on a third parameter included within the message; and processing the message based on the results of the determining steps.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
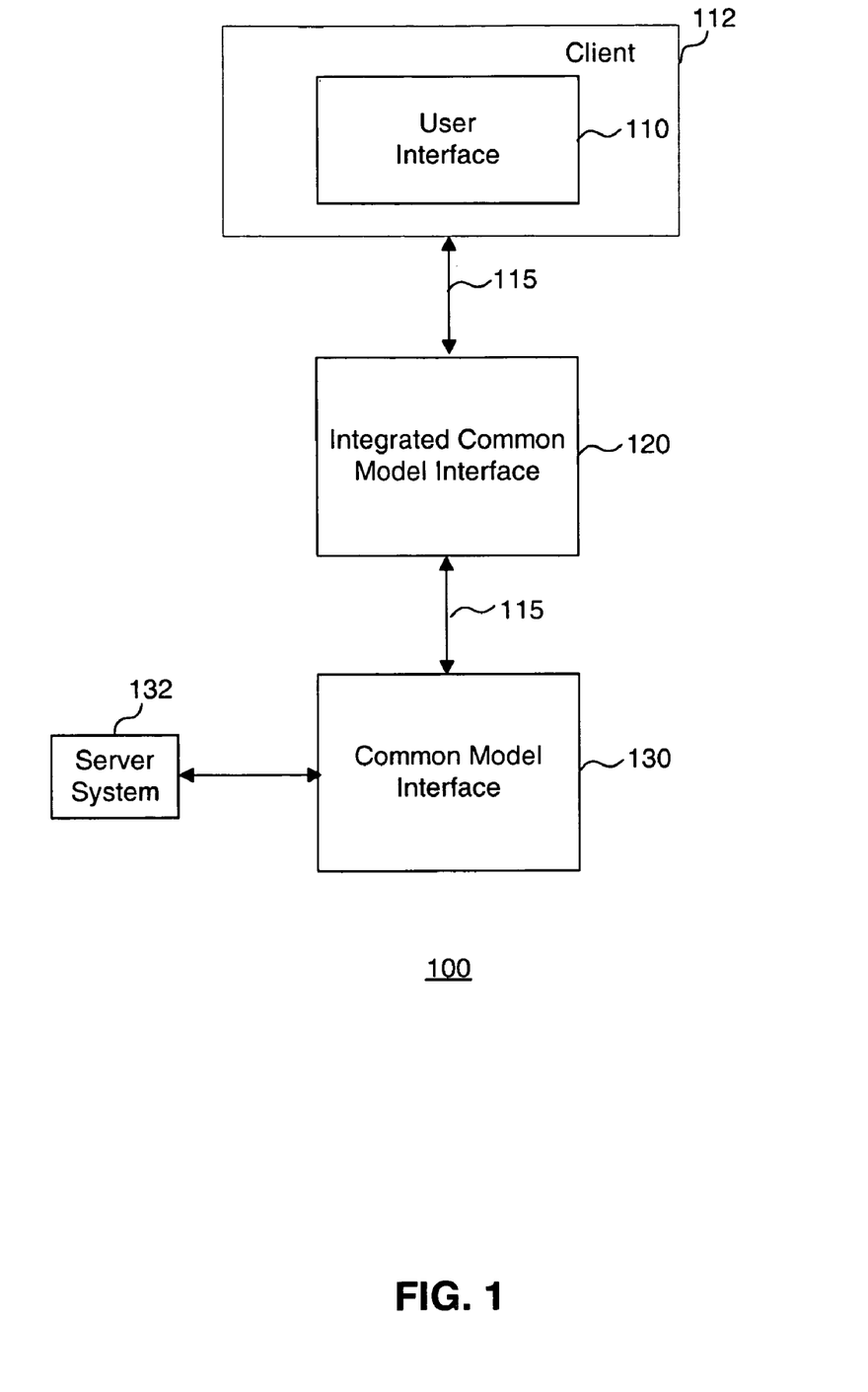
FIG. 1 illustrates a block diagram of an exemplary system 100 consistent with certain aspects related to the present invention.

FIG. 1 illustrates a block diagram of exemplary system 100. System 100 may include a user interface 110, an integrated common model interface (ICMI) 120, and a common model interface (CMI) 130, which may be connected using network connections 115.

Referring to FIG. 1, user interface 110 may determine whether at least one message relates to one or more objects at a server system 132 based on a first parameter included within the message. User interface 110 may also determine a lifetime of the message based on a second parameter included within the message and determine the severity of the message based on a third parameter included within the message. Moreover, user interface 110 may process the message based on the results of the determining steps. As such, various messaging formats for disparate applications may be supported by passing messages from a CMI 130 to a user interface 110 in a standardized manner using parameters. Moreover, an integrated common model interface (ICMI) 120 may be provided which supports a third parameter for severity, enhancing messaging with error and exception handling. Although user interface 110 is described as performing the determining steps and the processing steps, one or more of the components in FIG. 1 may perform these steps.

Client system 112 may include one or more processors, such as computers, and may include user interface 110. User interface 110 may allow users to interact with applications, such as web services, at server system 132 through CMI 130. User interface 110 may provide messages to a user using, for example, a display and/or audio devices. User interface 110 may be a program capable of being executed by client 112, and include a graphical user interface having buttons, edit fields, tables, and other items to enable interaction with applications. User interface 110 may operate with or include a web browser to allow a user to interact with the applications provided through CMI 130.

Network connections 115 may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide network connections 115 using bi-directional or unidirectional communication links, and/or direct links.

ICMI 120 may provide messaging capabilities, including automatic propagation of messages between user interface 110 and CMI 130. For example, if a user requests information related to a product displayed in a web browser, ICMI 120 may provide the information through a message from CMI 130. As described in detail below, ICMI 120 may include rules for processing messages in a standardized manner.

ICMI 120 may support different types of messages, including different message formats. For example, both asynchronous messaging, such as Simple Object Access Protocol (SOAP) message, and synchronous messaging, such as Remote Procedure Call (RPC) message, may be utilized. ICMI 120 may pass messages using different formats (e.g., different vendor implementations) to enable timely and reliable retrieval and the corresponding display of the messages. Additionally, messages may be localized to the user. A localized message may be a message having characteristics adapted to a user at client 112. For example, a localized message may have the characteristic of indicating a language that the user is able to read. The message may then be provided to a user in that language. Additionally, dates, times, currencies, and other characteristics may be adapted for a given client 112.

CMI 130 may serve as an interface, such as an API, to server system 132. Server system 132 may include one or more processors, such as a computer with applications. The applications may include one or more of the following: services, a database server, or an application server. Server system 132 may also include components of a distributed system architecture, such as an integration and application platform, databases, libraries, applications, and the like. An exemplary integration and application platform is the Exchange Infrastructure, commercially available from SAP (Walldorf, Germany), which may allow gathering data from multiple distributed systems and providing the data, in a consistent and timely manner, to a user interface.

Although ICMI 120 and CMI 130 are depicted as being separate from client 112 and server 132, ICMI 120 and CMI 130 can be located anywhere within client 112 and/or server system 132. Moreover, system 100 may be part of an enterprises services framework. An enterprise services framework allows services, such as a applications, to be aggregated to form composite business-level applications. Although described with respect to a client-server and an enterprise services framework system, system 100 can utilize any other framework or architectural environment.

Figure 2:
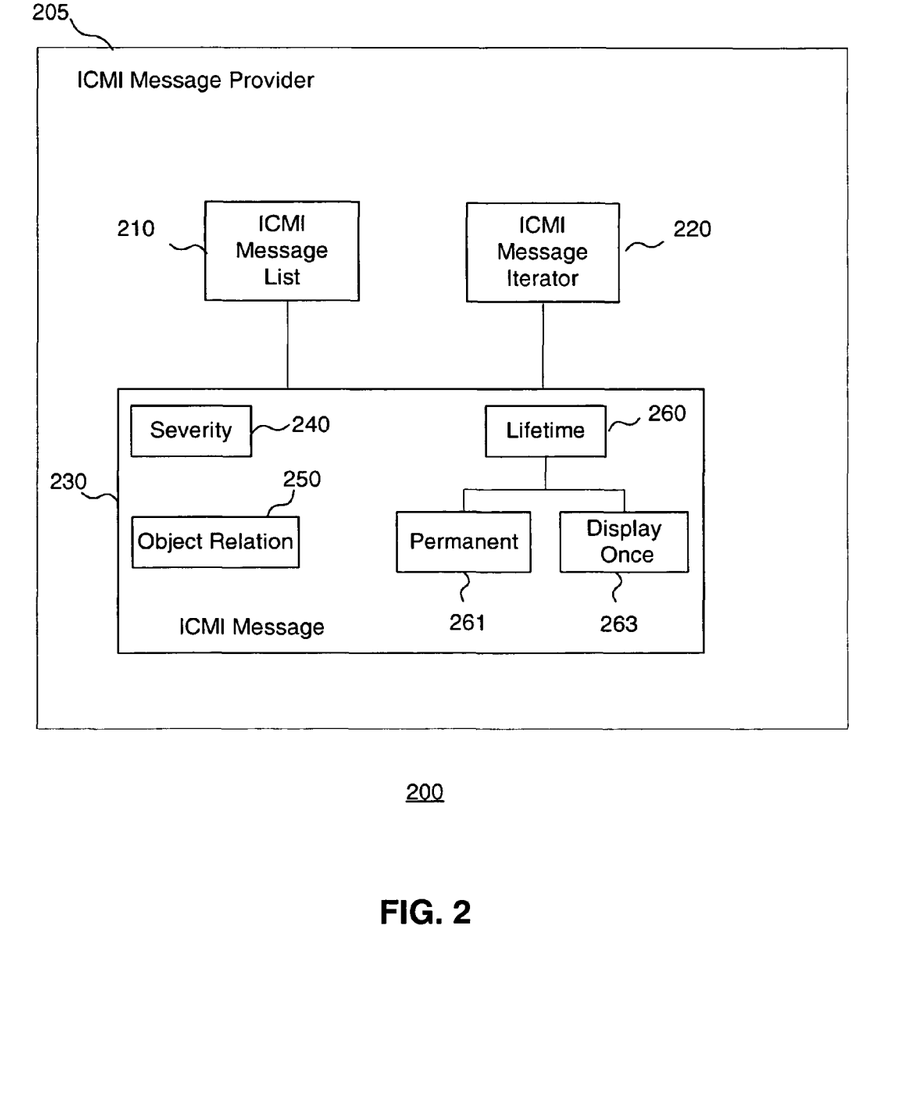
FIG. 2 illustrates a block diagram 200 for supporting an integrated common model interface in system 100 consistent with certain aspects related to the present invention.

FIG. 2 illustrates a block diagram 200 showing an ICMI message provider 205, which may be implemented as part of ICMI 120. ICMI message provider 205 may retrieve messages from CMI 130, process messages to provide messages in a uniform format, and provide messages to client 112. For example, user interface 110 may interact with an application at server 112 through ICMI 120 and CMI 130. The application may be a service associated with a catalog and may provide product information. ICMI message provider 205 may retrieve messages 230 associated with the product information through CMI 130 and server 132. Based on the retrieved messages, user interface 110 may provide a display of the product information for a user of client system 112.

One or more functions may be utilized by ICMI message provider 205 to handle ICMI messages 230. For example, ICMI message list 210 may be implemented as a collection object, which allows processing multiple ICMI messages 230 as a batch. User interface 110 may request ICMI messages 230 from CMI 130 and store the received ICMI messages 230 in a buffer for later batch processing by ICMI message list 210.

In another example, ICMI message iterator 220 may be used to iterate over messages 230. For example, ICMI message iterator 220 may iterate over and explicitly delete messages, such as ICMI message 230. ICMI message list 210 and ICMI message iterator 220 may be software functions that can be utilized by user interface 110 and/or CMI 130.

ICMI message 230 may be provided to user interface 110 for presentation to a user of user interface 110. However, some messages may not be capable of being presented at user interface 110, or it may not be necessary to present such messages. For example, user interface 110 may not be capable of presenting an ICMI message 230 that makes a button change colors to red on user interface 110 if user interface 110 does not include that button. Moreover, user interface 110 may not need to present an ICMI message 230 that changes a button color on user interface 110 if the message has expired and no longer requires presentation. As a result, ICMI message provider 205 may utilize ICMI message 230 and parameters 240-263 to control delivery of ICMI message 230 to user interface 110. The use of a "standardized" ICMI message 230 may enhance the processing of messages at system 100.

ICMI message 230 may include parameters such as severity 240, object relation 250, and lifetime 260. Using these parameters, ICMI message provider 205 may control, for example, whether to provide ICMI message 230 to client 112, when to provide ICMI message 230 to client 112, and the duration for ICMI message 230.

ICMI message severity 240 may define the severity, such as a warning level, of a message. Severity 240 may be implemented using, for example, enumeration. Severity 240 may indicate the status or type of a message, such as error, warning, success, or informational. Other severities 240 may be defined. Moreover, severity 240 may be used to facilitate propagation of ICMI message 230, such as prioritizing the delivery of error messages.

ICMI messages 230 may be associated with one or more objects, as indicated by object relation parameter 250. An "object" may refer to a software bundle of variables (e.g., data) and related methods. For example, in object-oriented programming, an object may be a concrete realization (instance) of a class that consists of data and the operations associated with that data. A user of user interface 110 may interact with an application, such as a service, at server system 132 through ICMI 120 and CMI 130 to access purchase orders. The purchase orders and related methods corresponding to object(s).

Object relation 250 may indicate whether ICMI message 230 relates to objects in a model. For example, ICMI message 230 may be related to a shipping date field of a purchase order. Object relation 250 may contain an identifier for the purchase order, as well as the field name of the shipping date field. Models may be used to define and perform the data exchange between components (e.g., a button, an icon, and the like) of user interface 110 and an application at server system 132. Models may be defined for each application running on server system 132, and may define the necessary communication methods, such as application classes, used by an application running on server 132. For example, a first model may be created for customers, and a second model may be created for business partners. An object may be associated with both the first model and the second model. Object relation 250 may be specified by the model of CMI 130. For example, a model may define a purchase order class containing fields. The fields may provide information such as the purchase order's shipping date and may indicate a relationship to other classes necessary to fulfill the purchase order, such as classes that identify items for ordering and a shipping address. Object relation 250 may capture these fields and relationships specified by the model. User interface 110 may display fields and relationships as necessary using a service, such as ICMI message list 210 or ICMI message iterator 220, to acquire ICMI messages 230, which can reference objects based on such models via object relation 250.

Lifetime 260 may define an ICMI message 230 lifetime and lifecycle. The lifetime parameter 260 may be defined, for example, using an enumeration and represented by instances of a class. Specifically, lifetime 260 may include the parameter 0800 representing that the message should expire at 0800 hours, although other mechanisms for defining the lifetime of a message could be used. FIG. 2 depicts ICMI message 230 as having a lifetime 260 that includes the following parameters: permanent lifetime 261 and display once lifetime 263. A message having permanent lifetime 261 may, for example, be an error message that indicates a shipping date requested by a user is not valid. This message may be displayed as long as the requested shipping date is not correct. Once a user changes the shipping date, the message may be removed from user interface 110. A message having display once lifetime 263 may, for example, indicate to a user that the purchase order has been successfully created. The message may be displayed once, acknowledged by a user, and removed from user interface 110.

ICMI messages 230 having permanent lifetime 261 and/or display once lifetime 263 may be added for display at user interface 110. These messages may then be marked as processed using, for example, a flag indicating that the messages have been processed (also referred to as a processed flag) by user interface 110. The processed flag may be checked by ICMI message provider 205 and/or user interface 110 to prevent the same message from being processed more than once by user interface 110.

ICMI messages 230 having a display once lifetime 263 may be displayed by user interface 110 to a user once and then deleted. ICMI messages 230 with a display once lifetime 263 may be deleted using ICMI message list 210 or using ICMI message iterator 220. Alternatively, ICMI messages 230 having a display once lifetime 263 may not be deleted, but rather marked as "processed" when displayed by user interface 110 using a processed flag. These ICMI messages 230 may then be deleted in a batch when ICMI message provider 205 is not busy.

ICMI messages 230 having permanent lifetime 261 may be displayed as long as the message exists. ICMI messages 230 marked as processed may be cleared by user interface 110 and/or by CMI 130. ICMI messages 230 may be cleared either by deletion or by resetting a processed flag to false, allowing ICMI messages 230 having a lifetime of permanent to be processed again by user interface 110 during the next iteration of message processing. ICMI messages 230 having permanent lifetime 261 may also be immutable, such that only display once 263 messages can be explicitly deleted.

Figure 3:
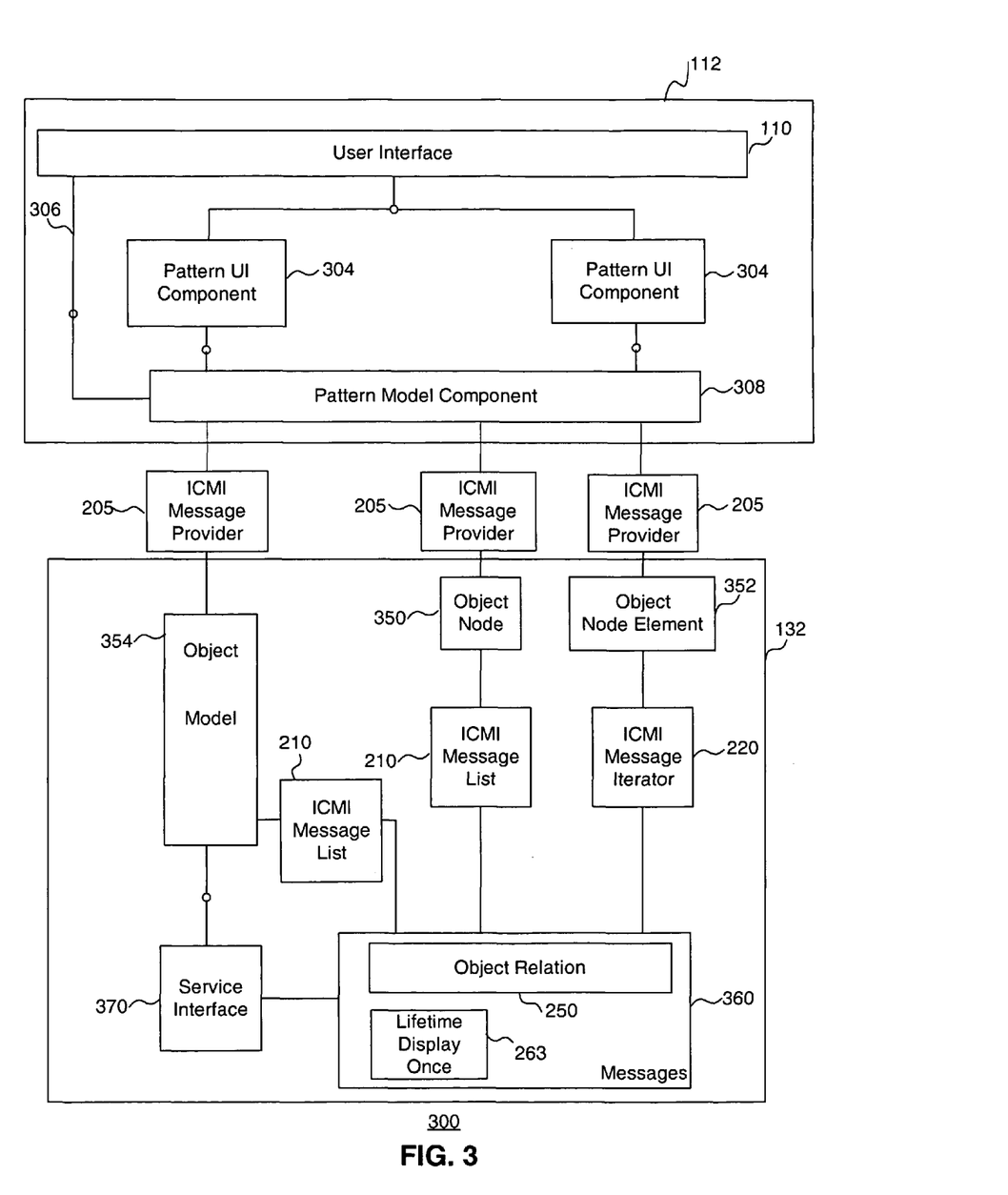
FIG. 3 illustrates a block diagram of an exemplary system configuration 300 consistent with certain aspects related to the present invention.

FIG. 3 illustrates a system 300. System 300 is similar to system 100, but distributes ICMI 120 throughout system 300. System 300 may include client 112, ICMI message providers 205, and server system 132.

Client 112 may also include user interface 110, CMI 130, pattern user interface components 304, and pattern model components 308.

User interface 110 may be implemented using an application, such as Web Dynpro commercially available from SAP AG. In order to allow automated message handling and display using user interface 110, ICMI message providers 205 may need to register with user interface 110. Registration allows user interface 110 to reference functions provided by ICMI message providers 205, such as ICMI message list 210 and ICMI message iterator 220.

Pattern model component 308 may register ICMI message providers 205 through pattern user interface components 304. Alternatively, ICMI message providers 205 may register directly with user interface 110 through network connection 306. Pattern model component 308 may be a pattern specific representation of data retrieved by object model 354. By creating a pattern specific representation of the data, pattern model component 308 may unify the interface to the data, regardless of how the data is retrieved. For example, if a pattern requires data to be created on different screens, then pattern model component 308 may buffer the data until all of the screens are complete, making the data ready for transmission to server system 132.

Registration of ICMI message providers 205 with pattern model component 308 may not be necessary when user interface 110 is able to automatically detect the existence of ICMI message provider(s) 205 and determine an appropriate method of communication between user interface 110 and ICMI message providers 205. For example, in some cases, only some of ICMI message providers 205 would be registered as message providers of objects, such as an object node 350, at server system 132.

Pattern user interface components 304 may register services and objects for use by user interface 110 and unify the way data may be displayed and created. For example, a purchase order may be created using a customer model or a business partner model. These models may define, for example, what purchase order information may be displayed to a user and how it is displayed. Pattern user interface components 304 may provide consistent visualization to a user regardless of whether the user is a customer or business partner. In this manner, pattern user interface components 304 may provide a familiar interface to the user.

Server system 132 may include an object node 350. Object node 350 may be, for example, a table containing one or more specific instances of an object. For example, an interface, such as an API, at server system 132 may correspond to a service. When the API is called, it may initiate object node 350.

Object node element 352 is a portion (or element) of object node 350 and may implement its own interface at server system 132. For example, if object node 350 corresponds to a list of purchase orders, object node element 352 may correspond to a single purchase order. ICMI message list 210 and ICMI message iterator 220 may service and handle messages 360 from server system 132 to ICMI message providers 205.

Object model 354 may define a model for messages 360 and act as a message provider for server system 132, although object node 350 and object node element 352 may also serve as message providers. Pattern model component 308 may select which ICMI message provider 205 to utilize depending on the scope of message retrieval desired. For example, if user interface 110 wants to retrieve all messages 360 for a list of purchase orders, pattern model component 308 may utilize ICMI message provider 205 for object node 350 corresponding to the list of purchase orders. If user interface 110 wants to retrieve messages for a single purchase order, pattern model component 308 may utilize ICMI message provider 205 for object node element 352 corresponding to the single purchase order. Service interface 370 may provide an API for server system 132 to retrieve messages 360.

Object model 354 may define an association between object nodes and the relationship between object nodes 350. Messages that belong to an object node 350 may also belong to an object model 354. Similarly, messages that belong to object node element 352 may be retrieved by object node 350 and/or object model 354. For example, if user interface 110 needs to display all messages in an object model 354, user interface 110 may access the messages using the ICMI message provider 205 for object model 354. If user interface 110 only needs to display messages belonging to a specific purchase order, then user interface 110 may access the purchase order messages using the ICMI message provider 205 for object node element 352 that represents the purchase order.

Messages 360 may be generated by server system 132 based on object model 354, with object model 354 having methods defining the contents of message 354. Messages 360 may contain a variety of parameters. For example, messages 360 may indicate object relation 250 and/or a lifetime display once 263.

ICMI message providers 205 may be included in either client 112 or server system 132. Object node 350, object node element 352, ICMI message list 210, ICMI message iterator 220, object model 354, and service interface 370, may be included in server system 132. However, some or all of the components in system configuration 300 may be included anywhere, such as in client 112, in server system 132, in a single system, or in multiple locations.

Figure 4:
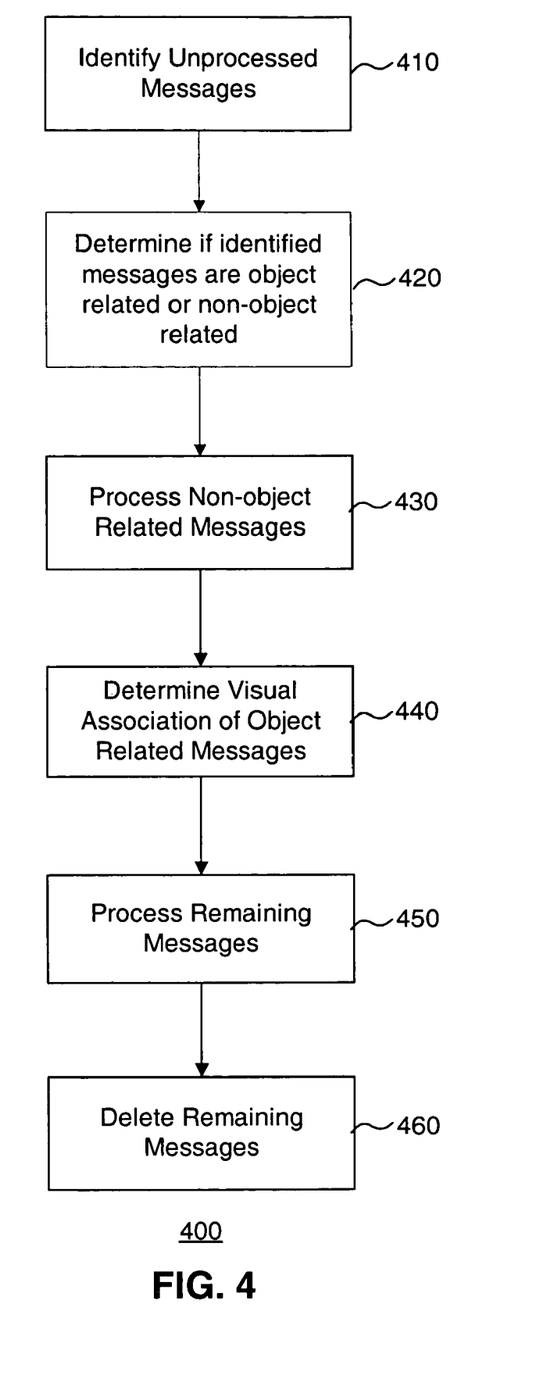
FIG. 4 illustrates an exemplary flowchart 400 for handling messages and defining message retrieval consistent with certain aspects related to the present invention.

FIG. 4 illustrates an exemplary flowchart 400 for handling messages and defining message retrieval. ICMI message provider 205 may define the scope of ICMI message 230 retrieval. A scope of retrieval may be defined using, for example, parameters such as ICMI message 230 severity 240, object relation 250, lifetime 260, and visual association. ICMI message provider 205 may utilize these parameters to determine which messages may be provided to user interface 110, in what order they may be provided to user interface 110, and the duration for which ICMI message 230 may be provided to user interface 110.

In order to avoid processing the same message contained in multiple ICMI message providers 205, a message may be checked to see if see if it includes a flag. The flag indicates whether the message has been processed. For example, if a message includes the processed flag (e.g., the processed flag is true), then the message has already been processed.

At step 410, user interface 110 may scan ICMI message providers 205 to identify unprocessed ICMI messages 230. An unprocessed ICMI message 230 may be one that user interface 110 has not yet retrieved or has a processed flag set to false. Messages that have already been processed and have a lifetime display once 263 may be deleted.

Client 112 may categorize the identified messages by determining if the ICMI messages 230 are object related 250 (step 420). At step 430, ICMI message provider 205 may process ICMI messages 230 that have not yet been processed and are not related to objects. Next, ICMI message provider 205 may determine the lifetime 260 of ICMI message 230. ICMI message provider 205 may then send ICMI messages 230 to user interface 110 for presentation. Once user interface 110 receives ICMI messages 230, if ICMI message lifetime 260 indicates display once 263, then ICMI message provider 205 may delete ICMI message 230. Otherwise, the ICMI message 230 may be continuously displayed by user interface 110 or marked as processed for subsequent deletion.

ICMI message provider 205 may check unprocessed ICMI messages 230 that are related to objects at server 132 to determine whether the object is related to items displayed through user interface 110 (step 440). The determination of whether the object is related to items displayed at user interface 110 is an example of a visual association. For example, a visual association may include associating a highlighted item of a display at user interface 120 with an instance of an object in an application at server system 132. ICMI message 230 may relate to the object in application at server system 132, and thus be associated with the highlighted item or field. In some implementations, ICMI message provider 205 may only associate items currently being displayed to objects at server 132 and their corresponding ICMI messages 230. Determination a visual association between items on the screen and ICMI messages will be described in further detail with reference to FIG. 5.

At step 450, ICMI message provider 205 may treat any ICMI messages 230 remaining after step 440 as ICMI messages 230 that are not related to objects. ICMI message provider 205 may provide these remaining ICMI messages 230 to user interface 110 without a visual association. ICMI message provider 205 may then delete these ICMI messages 230 if lifetime 260 indicates display once 263. Otherwise, ICMI message provider 205 may mark these ICMI messages 230 as processed to allow for subsequent deletion by user interface 110 or ICMI message provider 205. As discussed above, ICMI message provider 205 may mark ICMI messages 230 processed using a flag associated with ICMI message 205.

At step 460, any ICMI messages 230 remaining after step 450 may be deleted by ICMI message provider 205. Instead of deleting any remaining ICMI messages 230 having a lifetime permanent 261, a processed flag may be reset (e.g., processed flag set to false).

Figure 5:
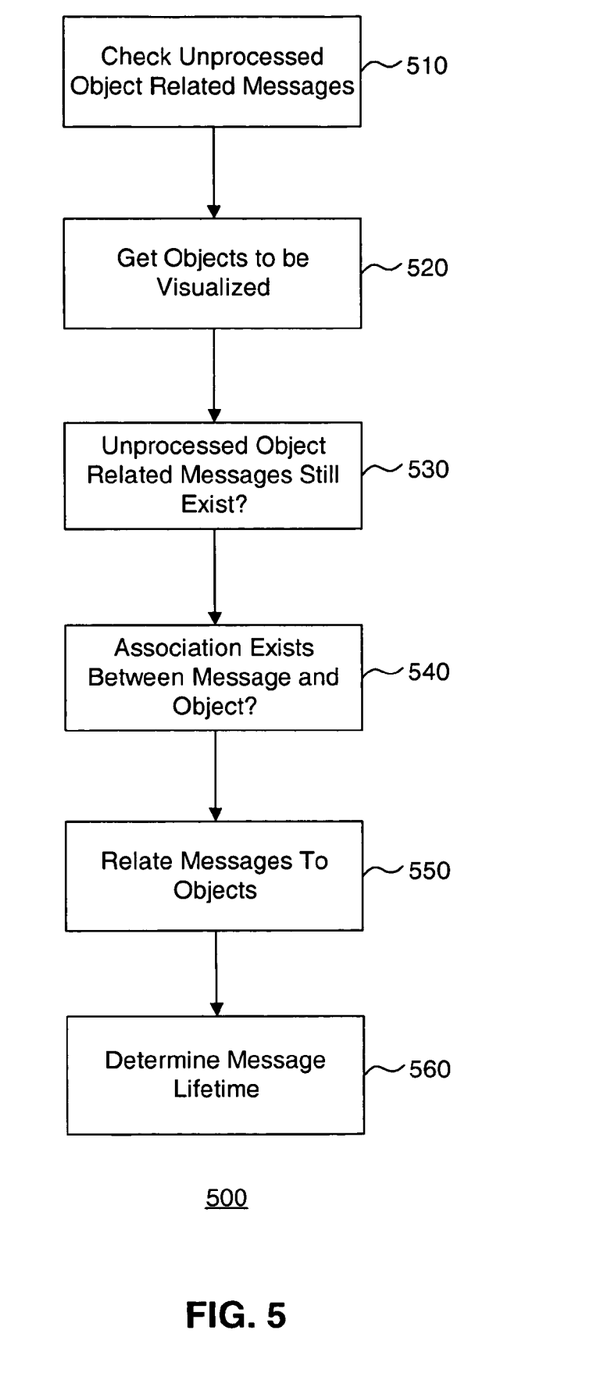
FIG. 5 illustrates an exemplary flowchart 500 for determining a visual association of messages consistent with the certain aspects related to the present invention.

FIG. 5 illustrates an exemplary flowchart 500 for determining visual associations (see, e.g., FIG. 4 at step 440) of ICMI messages 230. At step 510, ICMI messages 230 that have not been processed (e.g., a processed flag set to false) may be checked to determine whether ICMI messages 230 relate to one or more objects displayed at user interface 110. ICMI messages 230 may be checked using object relation 250.

For example, ICMI messages 230 may relate to objects at server 132 associated with items that are presented to a user through user interface 110. A user may select an item displayed through user interface 110. The displayed item may, for example, correspond to an object (e.g., object node 350 at server system 132) for requesting pricing information for a product. ICMI message provider 205 may provide to client 112 an ICMI message 205 responding to requested pricing information. In this example, the ICMI message 205 corresponding to the object providing the pricing information is visually associated with the item on the screen. Moreover, object relation 250 parameter of ICMI message 230 may include information to indicate the association. At step 520, if any ICMI messages 230 exist having a visual association indicated by, for example, object relation 250, then user interface 110 may retrieve from ICMI message provider 205 objects to be displayed (visualized) at user interface 110.

ICMI message provider 205 may determine if unprocessed ICMI messages 230 still exist (step 530). At step 540, if unprocessed ICMI messages 230 still exist, for those unprocessed messages, ICMI message provider 205 may determine an object relation 250 (e.g., whether the ICMI message 230 is associated with an object at server 132 and, if so, is the object or its ICMI message 230 correspond to an item being displayed at user interface 110). Next, ICMI message provider 205 may relate the ICMI messages 230 to objects (step 550). For example, ICMI message provider may use ICMI message list 210 and/or ICMI message iterator 220 to search ICMI messages 230 at ICMI message provider 205. ICMI message provider 205 may check object relation 250 of each ICMI message 205 to determine a relationship to an object. ICMI message provider 205 may then determine lifetimes 260 of remaining ICMI messages 230 (step 560). If lifetime 260 indicates display once 263, the ICMI message 230 may be deleted. Otherwise, such as if lifetime 260 indicates permanent 261, the ICMI message 230 may be marked processed.

Figure 6:
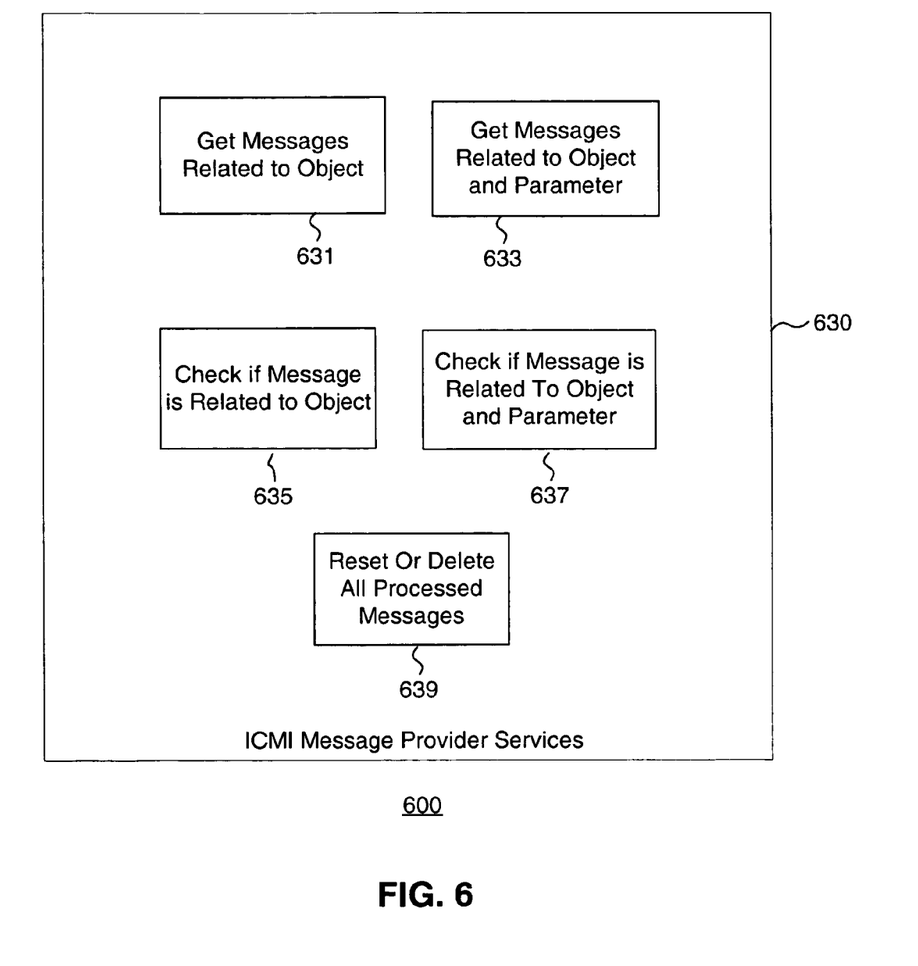
FIG. 6 illustrates a block diagram 600 of exemplary message handling capabilities of ICMI message provider 200 consistent with certain aspects related to the present invention.

FIG. 6 illustrates a block diagram 600 of exemplary message handling services of ICMI message provider 205. ICMI message provider 205 may provide services 630 that user interface 110 may access to retrieve, process, and present ICMI message 230.

As illustrated at 631, user interface 110 may request that ICMI message provider 205 provide ICMI message(s) 230 related to an object model 354, object node 350, and an object node element 352. For example, ICMI messages 230 related to an object 354 may provide product information, such as a vehicle presented on user interface 110. User interface 110 may request all ICMI messages 230 related to the object (e.g., the product information for the vehicle).

As illustrated at 633, user interface 110 may request that ICMI message provider 205 provide ICMI message(s) 230 related to a specific object and parameter. Continuing with the example of a vehicle presented on user interface 110, user interface 110 may retrieve a narrower scope of ICMI messages 230 based on a parameter, such as ICMI message 230 severity 240. For example, user interface 110 may display error messages differently than success messages. User interface 110 may request a narrower scope of error messages.

As illustrated at 635, user interface 110 may request that ICMI message provider 205 determine whether any ICMI message(s) 230 relate to an object using object relation 250. For example, user interface 110 may request ICMI message provider 205 to determine whether any ICMI messages 230 relate to object-A. ICMI message provider 205 may use ICMI message list 210 and/or ICMI message iterator 220 to search ICMI messages 230 at ICMI message provider 205. ICMI message provider 205 may check object relation 250 of each ICMI message 205 to determine a relationship to object-A. At 637, ICMI message provider 205 may also determine if ICMI message(s) 230 relate to an object and parameter, such as ICMI message 230 lifetime 260.

As illustrated at 639, ICMI message provider 205 may reset or delete processed ICMI messages 230. For example, ICMI message provider 205 may utilize ICMI message iterator 220 to iterate over and delete processed ICMI messages 230. Alternatively, ICMI message provider 205 may reset or clear a processed flag (e.g., set a processed flag to true).

Although services 631-639 are described, additional message handling services and capabilities may be used based on the implementation. Although ICMI message provider 205 may receive message 360 from server system 132 and form ICMI message 230, ICMI message provider 205 may also receive message 360 for use as ICMI message 230. As such, when message 360 is used as ICMI message 230, message 360 from server system 132 may not need to be repackaged.

The systems and methods disclosed herein may be embodied in various forms including, for example, a data processor, such as a computer that also includes a database, digital electronic circuitry, memory, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A method comprising:
   retrieving, by an integrated common model interface message provider, at least one of a plurality of messages from a plurality of common model interfaces;
   processing, at the integrated common model interface message provider, at least one of the plurality of messages to provide, to a graphical user interface, the at least one message in a uniform format used for all messages from the plurality of common model interfaces processed by the integrated common model interface message provider and provided to the graphical user interface, each of plurality of messages provided in the uniform format including a first parameter, a second parameter, and a third parameter, the processing comprising:

determining, at the integrated common model interface message provider, whether the at least one message is related to one or more objects at a server based on the first parameter included within the at least one message, wherein the first parameter included with each of the plurality of messages provided in the uniform format comprising information for a respective one of the each of the plurality of messages specifying relationships of the respective one of the each of the plurality of messages to one or more objects in a model associated with one or more applications, the model includes information defining, at least in part, data communication and exchange procedures between the model and another model;

determining a lifetime of the at least one message based on the second parameter included within the at least one message, wherein the lifetime comprises at least one of a permanent lifetime and a display once lifetime;

determining a severity of the at least one message based on the third parameter included within the at least one message, wherein the message severity indicates a warning level of the at least one message;

providing the at least one message to the graphical user interface, based on the results of the determining steps.

2. The method of claim 1, wherein the model defines a relationship between the one or more objects at the server and fields presented at the graphical user interface.

3. The method of claim 1, wherein the integrated common model interface message provider includes a message list and a message iterator to acquire the plurality of messages provided to the graphical user interface, the plurality of messages referencing, based on the model, the one or more objects.

4. A method comprising:

receiving, at an integrated common model interface message provider, one or more messages from at least one of a plurality of common model interfaces, each of the messages including a first parameter indicating a relationship between the message and one or more objects at a server and a second parameter indicating a lifetime of the message;

processing the one or more messages to provide the one or more messages to a graphical user interface, the one or more messages being provided in a uniform format used for all messages from the plurality of common model interfaces received at the integrated common model interface and provided to the graphical user interface, the processing comprising:

identifying, at the integrated common model interface message provider, messages to be displayed by the graphical user interface;

determining, at the integrated common model interface message provider based on the first parameter, whether a first message identified to be displayed is related to one or more objects at the server, wherein the first parameter included with each of the one or more messages provided in the uniform format comprising information for a respective one of the each of the one or more messages specifying relationships of the respective one of the each of the one or more messages to one or more objects in a model associated with one or more applications, the model includes information defining, at least in part, data communication and exchange procedures between the model and another model;

displaying, by the graphical user interface, the first message when the first message is not related to at least one of the objects at the server for a duration identified by the second parameter;

determining, at the integrated common model interface message provider based on the first parameter, whether a second message identified to be displayed is associated with at least one of the objects at the server and one or more items displayed on the graphical user interface; and displaying, by the graphical user interface, the second message when the second message is associated with at least one of the objects and one or more items displayed on the graphical user interface.

5. The method of claim 4, further comprising:
determining whether an association exists by retrieving objects that are to be displayed.

6. A non-transitory computer-readable storage medium that stores a set of instructions which, when executed, performs a method comprising:

retrieving, by an integrated common model interface message provider, at least one of a plurality of messages from a plurality of common model interfaces;

processing, at the integrated common model interface message provider, at least one of the plurality of messages to provide, to a graphical user interface, the at least one message in a uniform format used for all messages from the plurality of common model interfaces processed by the integrated common model interface message provider and provided to the graphical user interface, each of plurality of messages provided in the uniform format including a first parameter, a second parameter, and a third parameter, the processing comprising:

determining, at the integrated common model interface message provider, whether the at least one message is related to one or more objects at a server based on the first parameter included within the at least one message, wherein the first parameter included with each of the plurality of messages provided in the uniform format comprising information for a respective one of the each of the plurality of messages specifying relationships of the respective one of the each of the plurality of messages to one or more objects in a model associated with one or more applications, the model includes information defining, at least in part, data communication and exchange procedures between the model and another model;

determining a lifetime of the at least one message based on the second parameter included within the at least one message, wherein the lifetime comprises at least one of a permanent lifetime and a display once lifetime;

determining a severity of the at least one message based on the third parameter included within the at least one message, wherein the message severity indicates a warning level of the at least one message;

providing the at least one message to the graphical user interface, based on the results of the determining steps.

7. The non-transitory computer-readable storage medium of claim 6, wherein the model defines a relationship between the one or more objects at the server and fields presented at the graphical user interface.

8. The non-transitory computer-readable storage medium of claim 6, wherein the integrated common model interface includes a message list and a message iterator to acquire the plurality of messages provided to the graphical user interface, the plurality of messages referencing, based on the model, the one or more objects.

9. A non-transitory computer-readable storage medium that stores a set of instructions which, when executed, performs a method comprising:
- receiving, at an integrated common model interface message provider, one or more messages from at least one of a plurality of common model interfaces, each of the messages including a first parameter indicating a relationship between the message and one or more objects at a server and a second parameter indicating a lifetime of the message;
- processing the one or more messages to provide the one or more messages to a graphical user interface, the one or more messages being provided in a uniform format used for all messages from the plurality of common model interfaces received at the integrated common model interface and provided to the graphical user interface, the processing comprising:
- identifying messages to be displayed by the graphical user interface;
- determining, at the integrated common model interface message provider based on the first parameter, whether a first message identified to be displayed is related to one or more objects at the server, wherein the first parameter included with each of the one or more messages provided in the uniform format comprising information for a respective one of the each of the one or more messages specifying relationships of the respective one of the each of the one or more messages to one or more objects in a model associated with one or more applications, the model includes information defining, at least in part, data communication and exchange procedures between the model and another model;
- displaying, by the graphical user interface, the first message when the first message is not related to at least one of the objects at the server for a duration identified by the second parameter;
- determining, at the integrated common model interface message provider based on the first parameter, whether a second message identified to be displayed is associated with at least one of the objects at the server and one or more items displayed on the graphical user interface; and
- displaying, by the graphical user interface, the second message when the second message is associated with at least one of the objects and one or more items displayed on the graphical user interface.

10. A system comprising:
a processor, and
a memory,
wherein the processor and memory are configured to perform a method comprising:
- retrieving, by an integrated common model interface message provider, at least one of a plurality of message from a plurality of common model interfaces;
- processing, at the integrated common model interface message provider, at least one of the plurality of messages to provide, to a graphical user interface, the at least one message in a uniform format used for all messages from the plurality of common model interfaces processed by the integrated common model interface message provider and provided to the graphical user interface, each of the plurality of messages provided in the uniform format including a first parameter, a second parameter, and a third parameter, the processing comprising:
- determining whether at least one message is related to one or more objects at a server based on a first parameter included within the message, wherein the first parameter included with each of the plurality of messages provided in the uniform format comprising information for a respective one of the each of the plurality of messages specifying relationships of the respective one of the each of the plurality of messages to one or more objects in a model associated with one or more applications, the model includes information defining, at least in part, data communication and exchange procedures between the model and another model;
- determining, at the integrated common model interface message provider, whether the at least one message is related to one or more objects at a server based on the first parameter included within the at least one message, wherein the first parameter indicates whether the at least one message is related to one or more objects in a model;
- determining a lifetime of the at least one message based on the second parameter included within the at least one message, wherein the lifetime comprises at least one of a permanent lifetime and a display once lifetime;
- determining a severity of the at least one message based on the third parameter included within the at least one message, wherein the message severity indicates a warning level of the at least one message;
- providing the at least one message to the graphical user interface, based on the results of the determining steps.

11. A system comprising:
a processor, and
a memory,
wherein the processor and memory are configured to perform a method comprising:
- receiving, at an integrated common model interface message provider, one or more messages from at least one of a plurality of common model interfaces, each of the messages including a first parameter indicating a relationship between the message and one or more objects at a server and a second parameter indicating a lifetime of the message;
- processing the one or more messages to provide the one or more messages to a graphical user interface, the one or more messages being provided in a uniform format used for all messages from the plurality of common model interfaces received at the integrated common model interface and provided to the graphical user interface, the processing comprising:
- identifying messages to be displayed by the graphical user interface;
- determining, at the integrated common model interface message provider based on the first parameter, whether a first message identified to be displayed is related to one or more objects at the server, wherein the first parameter included with each of the one or more messages provided in the uniform format comprising information for a respective one of the each of the one or more messages specifying relationships of the respective one of the each of the one or more messages to one or more objects in a model associated with one or more applications, the model includes information defining, at least in part, data communication and exchange procedures between the model and another model;
- displaying, by the graphical user interface, the first message when the first message is not related to at least one of the objects at the server for a duration identified by the second parameter;
- determining, at the integrated common model interface message provider based on the first parameter, whether a second message identified to be displayed is associated with at least one of the objects at the server and one or more items displayed on the graphical user interface; and displaying, at the integrated common model interface message provider by the graphical user interface, the second message when the second message is associated with at least one of the objects and one or more items displayed on the graphical user interface.

* * * * *